United States Patent
Lang et al.

(10) Patent No.: US 6,991,293 B2
(45) Date of Patent: Jan. 31, 2006

(54) VEHICLE SEAT SUPPORT FRAME ASSEMBLY

(75) Inventors: Yue Lang, Northville, MI (US); Edward H. Poulos, Grosse Ile, MI (US); Karl A. Murphy, Novi, MI (US); Hsing Lung Lewis Liu, Novi, MI (US)

(73) Assignee: Porter Group, LLC, Novi, MI (US)

( * ) Notice: Subject to any disclaimer, the term of this patent is extended or adjusted under 35 U.S.C. 154(b) by 195 days.

(21) Appl. No.: 10/682,704

(22) Filed: Oct. 9, 2003

(65) Prior Publication Data

US 2005/0077770 A1    Apr. 14, 2005

(51) Int. Cl.
*B60N 2/10* (2006.01)

(52) U.S. Cl. ............... 297/336; 297/344.1; 296/65.03; 296/65.09

(58) Field of Classification Search ............... 297/336, 297/335; 296/65.03, 65.09
See application file for complete search history.

(56) References Cited

U.S. PATENT DOCUMENTS

| | | | |
|---|---|---|---|
| 4,227,736 A | 10/1980 | Lebault et al. | |
| 4,606,577 A | 8/1986 | Hirama et al. | |
| 4,695,094 A * | 9/1987 | Siebler | 297/336 |
| 5,934,732 A | 8/1999 | Jakubiec | |
| 6,196,613 B1 | 3/2001 | Arai | |
| 6,345,867 B1 | 2/2002 | Hellrung et al. | |
| 6,412,849 B1 | 7/2002 | Fast | |
| 6,520,581 B1 * | 2/2003 | Tame | 297/336 |
| 6,595,588 B2 * | 7/2003 | Ellerich et al. | 297/336 |
| 6,698,837 B2 * | 3/2004 | Pejathaya et al. | 297/336 X |
| 2003/0006637 A1 | 1/2003 | Jach et al. | |

FOREIGN PATENT DOCUMENTS

JP        57104424 A  *  6/1982

* cited by examiner

*Primary Examiner*—Anthony D. Barfield
(74) *Attorney, Agent, or Firm*—Brooks Kushman P.C.

(57) ABSTRACT

A vehicle seat support frame assembly (14) has a seat cushion base member (16) with opposite ends (20) and (22) pivotally connected to first and second legs (28, 40). The first legs (28) are also pivotally connected to the associated vehicle and the second legs (40) have first and second latches (50) and (52). Each first latch (50) provides securement of the associated second leg to the associated vehicle in the seating position, and each second latch (52) prevents pivoting between the second leg and the seat cushion base member end (22) to provide rigidity in the seating position.

12 Claims, 5 Drawing Sheets

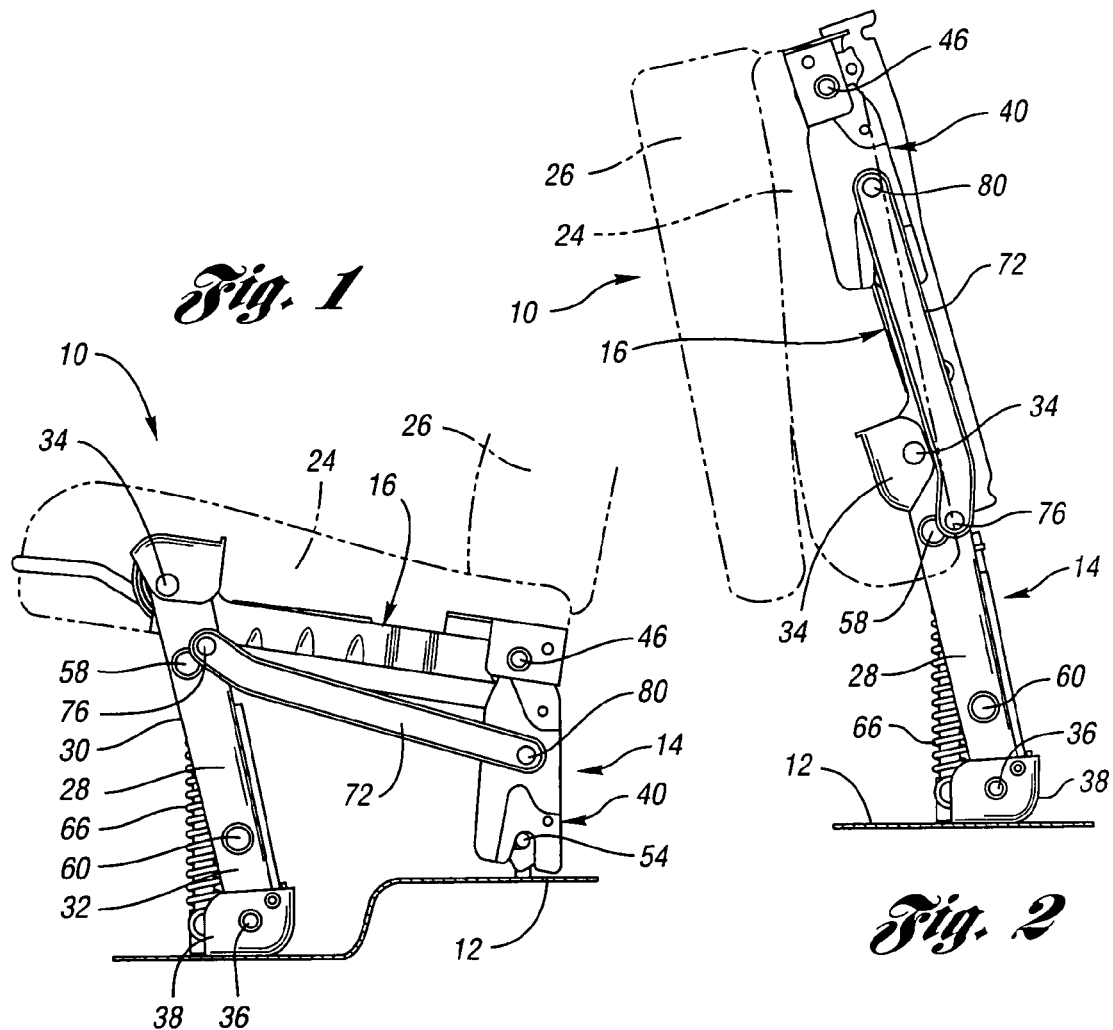
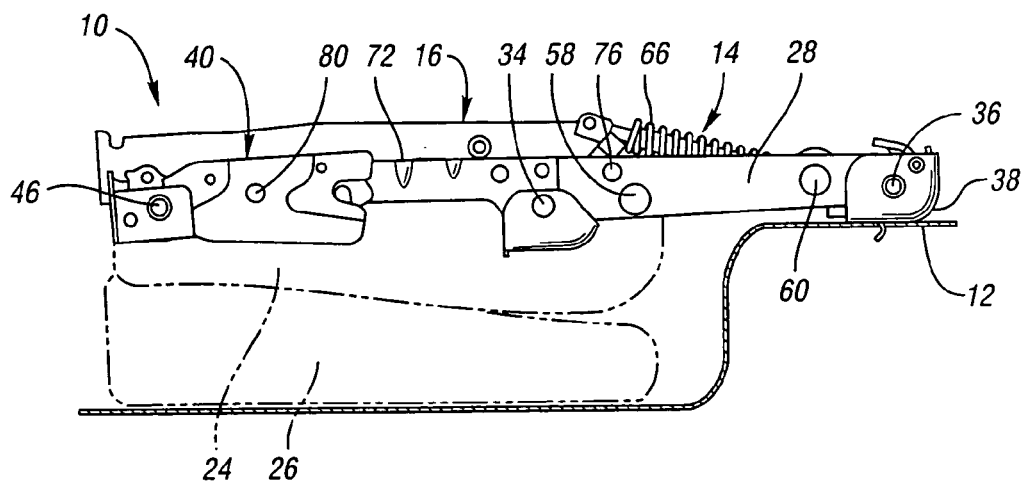

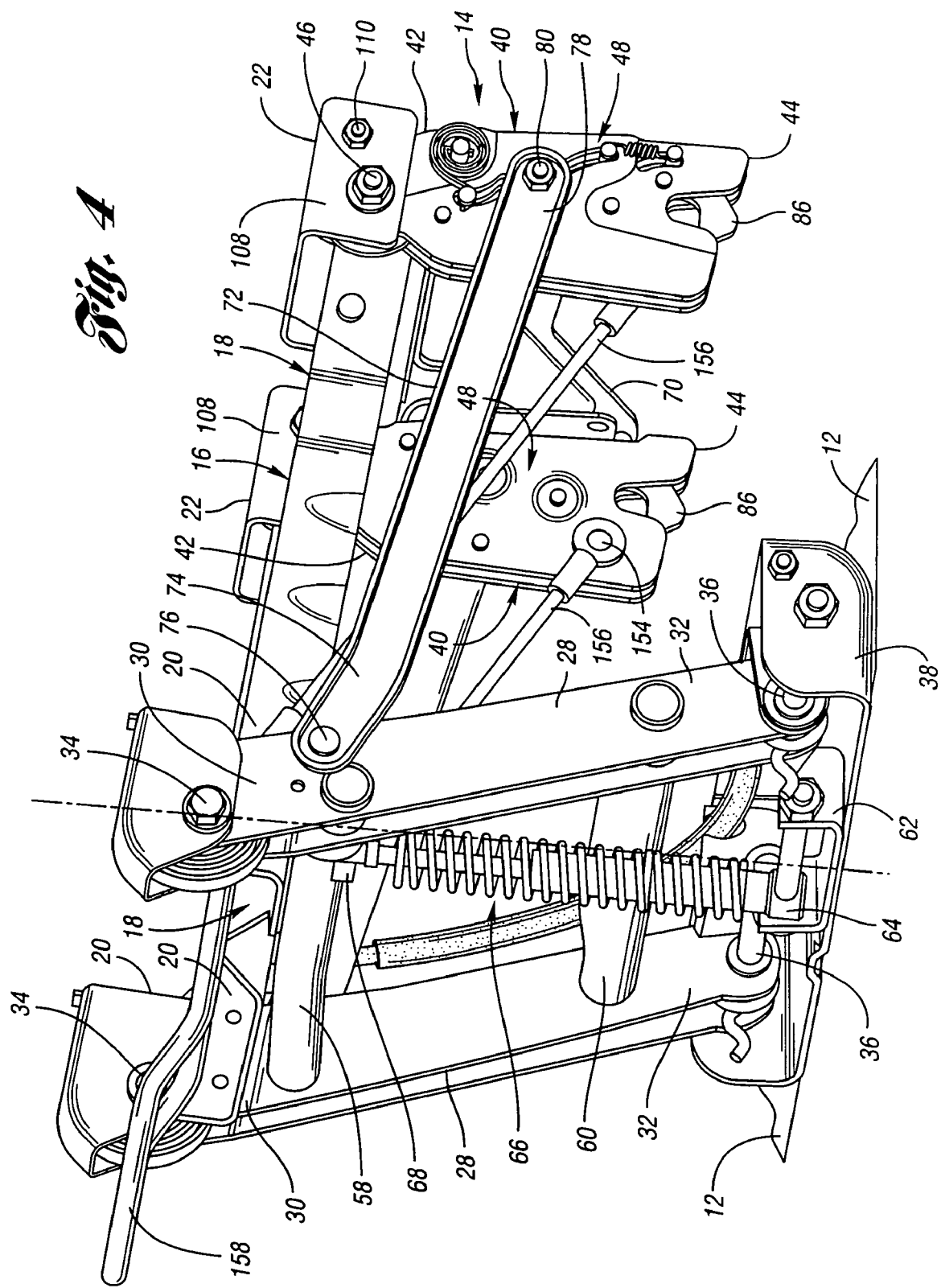

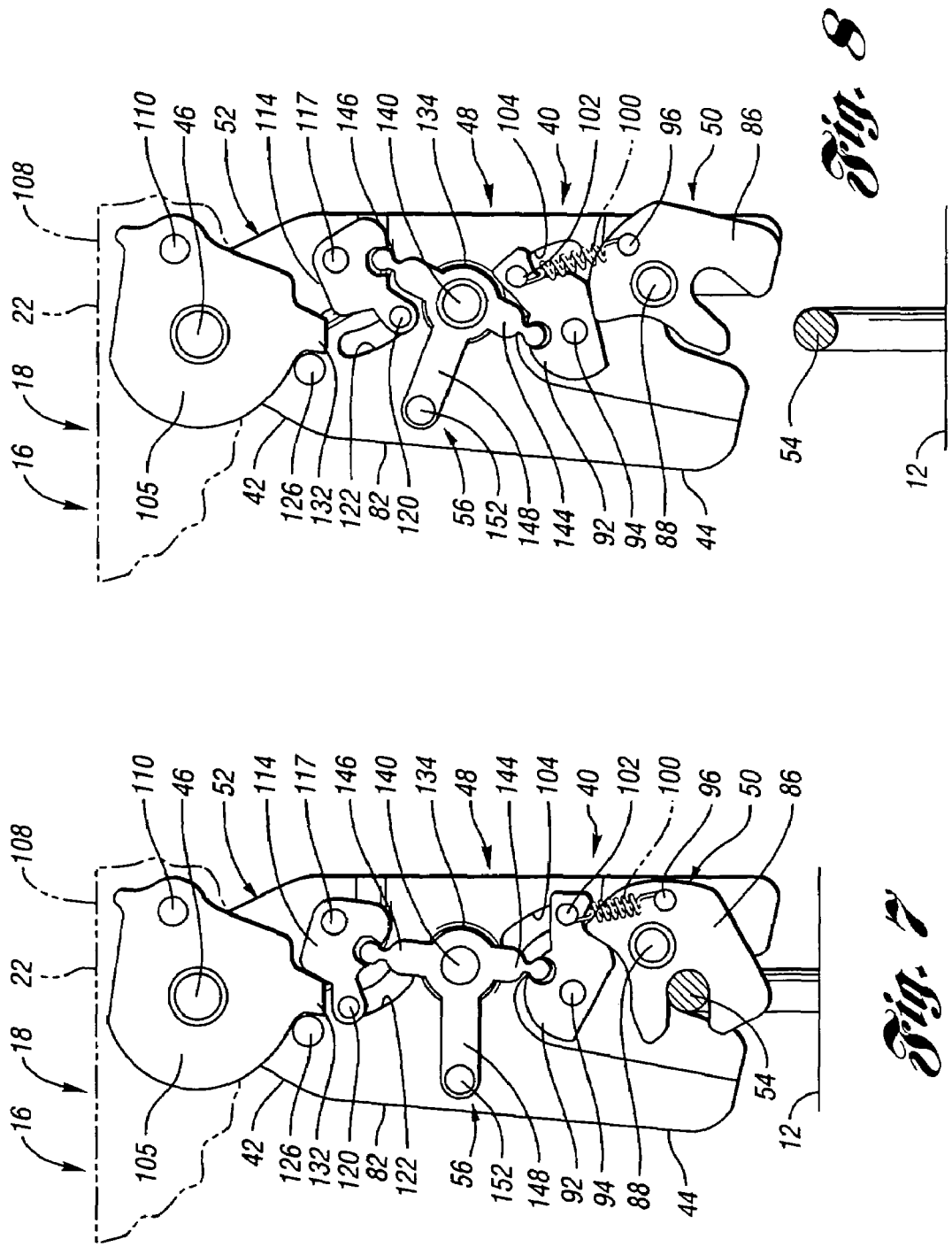

VEHICLE SEAT SUPPORT FRAME ASSEMBLY

BACKGROUND OF THE INVENTION

1. Field of the Invention

This invention relates to a vehicle seat support frame assembly for mounting a vehicle seat for movement between use and stowed positions.

2. Background Art

Support frame assemblies for vehicle seats conventionally have pivotal connections about which components pivot during movement of associated vehicle seats between seating and stowed positions. In the seating position, a seat cushion extends generally horizontally with a slight upward tilt toward the front, and a seat back extends generally upright from the rear extremity of the seat cushion with a slight rearward inclination. During movement of the seat to the stowed position, the seat back and seat cushion pivot with respect to each other and with respect to the associated frame and usually provide a cargo floor.

Prior art noted during an investigation conducted in connection with the present invention include: U.S. Pat. No. 4,227,736 Lebault et al.; U.S. Pat. No. 4,606,577 Hirama et al.; U.S. Pat. No. 5,934,732 Jakubiec; U.S. Pat. No. 6,196,613 Arai; U.S. Pat. No. 6,345,867 Hellrung et al.; and U.S. Pat. No. 6,412,849 Fast; and United States Patent Application Publication US 2003/0006637 Jach et al.

SUMMARY OF THE INVENTION

An object of the present invention is to provide an improved vehicle seat support frame assembly for mounting a vehicle seat for movement between use and stowed positions and having rigidity in the use position.

In carrying out the above object, the vehicle seat support frame assembly of the invention includes a seat cushion base member having opposite ends. A first leg has opposite ends one of which includes a pivotal connection for providing pivotal connection to one of the ends of the seat cushion base member and the other of which includes a pivotal connection for providing pivotal connection thereof to an associated vehicle. A second leg has opposite ends one of which includes a pivotal connection for providing pivotal connection to the other end of the seat cushion base member and the other of which provides support thereof on the vehicle in a seating position. A latch assembly includes a first latch having a latched condition for providing connection of the other end of the second leg to the associated vehicle in the seating position and having an unlatched condition for releasing the other end of the second leg from the vehicle for pivoting of the pivotal connections and concomitant movement of the seat support frame assembly to a stowed position. A second latch of the latch assembly has a latched condition extending between the second leg and the seat cushion base member to prevent pivoting of the pivotal connection between the one end of the second leg and the other end of the seat cushion base member in the seating position to provide rigidity to the seat support frame assembly, and the second latch has an unlatched condition disconnected between the second leg and the seat cushion frame member to permit pivotal movement of the pivotal connection between the one end of the second leg and the other end of the seat cushion base member during movement of the seat support frame assembly between the seating and stowed positions. A release actuator of the latch assembly selectively releases the first and second latches from their latched conditions to their unlatched conditions to permit movement of the seat support frame assembly from the seating position to the stowed position.

The vehicle support frame assembly is disclosed as including a control link extending between the first and second legs to control pivoting of the first and second legs with respect to the base member during movement of the seat support frame assembly between the seating and stowed positions. The control link has a first end including a pivotal connection to the first leg and a second end including a pivotal connection to the second end. The pivotal connection of the control link to the first leg is located closer to the pivotal connection of the first leg to the one end of the seat cushion base member than the pivotal connection of the control link to the second leg is to the pivotal connection of the second leg to the other end of the seat cushion base member.

The first latch of the latch assembly includes a latch member having a latched position for securing the second leg to the vehicle with the seat support frame assembly in the seating position and having an unlatched position where the second leg is released to permit movement of the seat support frame assembly to the stowed position. The first latch also includes a blocking member that is movable between a blocking position where it holds the latch member of the first latch in its latched position and an unblocked position where the latch member of the first latch is movable to its unlatched position.

The second latch of the latch assembly includes a latching member and a blocking member that is movable between a blocking position where it holds the latching member of the second latch to prevent pivoting of the second leg with respect to the seat cushion base member and an unblocked position where the latching member of the second latch permits pivoting of the second leg with respect to the seat cushion base member.

The latch assembly also includes a common release actuator that is actuated to move the blocking members of the first and second latches from their blocking positions to their unblocked positions to release the second leg of the seat support frame from the vehicle and permit pivoting of the second leg with respect to the seat cushion base member.

The seat cushion base member of the frame assembly includes a pair of laterally spaced sides each of which includes opposite ends, and the assembly further includes a pair of the first legs respectively associated with the pair of sides of the seat cushion base member, a pair of the second legs respectively associated with the pair of sides of the seat cushion base member, and a pair of the latch assemblies respectively associated with the pair of sides of the seat cushion base member that embody the pair of second legs. A cable release is connected to the release actuator of each of the pair of latch assemblies.

The objects, features and advantages of the present invention are readily apparent from the following detailed description of the preferred embodiment when taken in connection with the accompanying drawings.

BRIEF DESCRIPTION OF THE DRAWINGS

FIG. 1 is a side elevational view illustrating a vehicle seat support frame assembly constructed in accordance with the present invention and shown in a seating position.

FIG. 2 is a view showing the vehicle seat support frame assembly partially moved from the seating position of FIG. 1 toward a stowed position.

FIG. 3 is a view that shows the vehicle seat support frame assembly in its fully stowed position.

FIG. 4 is a perspective view illustrating the vehicle seat support frame assembly of the invention in its seating position.

FIG. 7 is another view of the latch assembly with first and second latches thereof shown in latched conditions.

FIG. 8 is a further view of the latch assembly similar to FIG. 7 but with the first and second latches shown in an unlatched condition.

DETAILED DESCRIPTION OF THE PREFERRED EMBODIMENT

Figure 5:
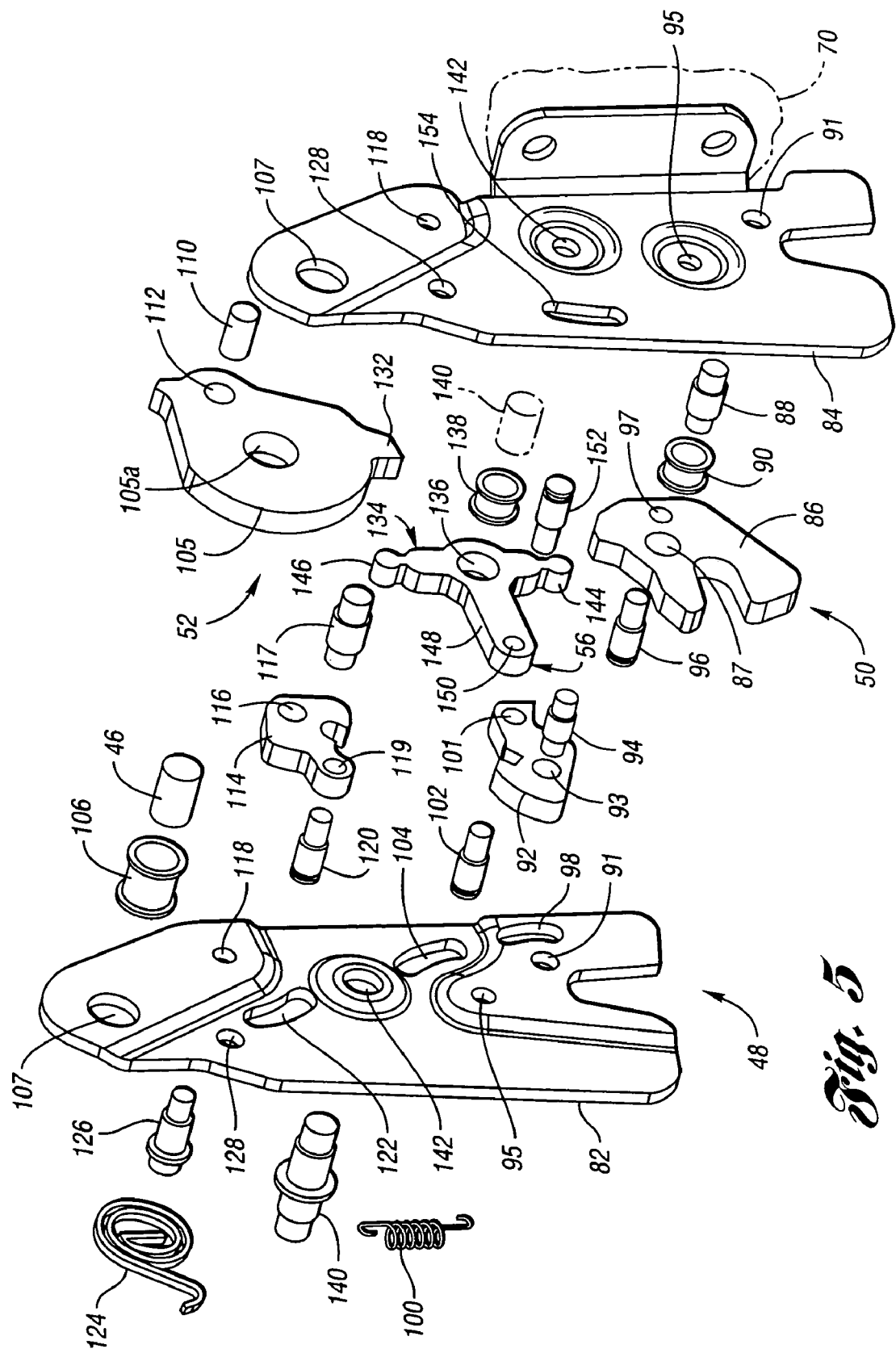
FIG. 5 is an exploded perspective view of a latch assembly of the vehicle seat support frame assembly.

With reference to FIGS. 1–3 of the drawings, a vehicle seat generally indicated by 10 is mounted on a vehicle floor 12 and includes a support frame assembly 14 that is constructed in accordance with the present invention and movable between the seating position of FIG. 1 and the stowed position of FIG. 3 while passing through the intermediate position of FIG. 2. With continuing reference to FIGS. 1–3 and additional reference to FIG. 4, the frame assembly 14 includes a seat cushion base member 16 which includes a pair of laterally spaced sides 18 each of which has opposite ends 20 and 22. The seat cushion base member supports a vehicle seat cushion 24 shown in FIGS. 1–3 and also supports an associated seat back 26 in any suitable manner for pivotal movement with respect to the seat cushion between the broken away upright position of FIG. 1 and the folded position of FIGS. 2 and 3 in connection with movement between the seating and stowed positions.

With continuing reference to FIGS. 1–4, the frame assembly 14 includes a pair of laterally spaced first legs 28 each of which has opposite ends 30 and 32. The one end 30 of each first leg 28 includes a pivotal connection 34 to the one end 20 of the associated side 18 of the seat cushion base member 16. The other end 32 of each first leg 28 has a pivotal connection 36 to a vehicle floor attachment bracket 38 that is mounted on the vehicle floor 12 in any suitable manner.

With further reference to FIGS. 1–4, the frame assembly 14 also includes a pair of laterally spaced second legs 40 having opposite ends 42 and 44. The one end 42 of each second leg 40 includes a pivotal connection 46 for providing pivotal connection to the end 22 of the associated side 18 of the seat cushion base member 16. The other end 44 of each second leg 40 provides support thereof on the vehicle in the seating position as shown in FIG. 1.

Each of the second legs 40 illustrated in FIGS. 1–4 includes a latch assembly 48 having first and second latches 50 and 52. The first latch 50 has a latched condition shown in FIG. 7 for providing connection of the second leg end 44 to the associate vehicle by securement to a floor mounted striker 54. The first latch 50 also has an unlatched condition shown in FIG. 8 for releasing the second leg end 44 from the floor mounted striker 54 of the vehicle in order to permit movement of the seat support frame assembly to the stowed position as previously described in connection with FIGS. 1–3.

The second latch 52 of each latch assembly 48 has a latched condition shown in FIG. 7 extending between the associated second leg 42 and the adjacent side 18 of the seat cushion base member 16 to prevent pivoting of the pivotal connection 46 between the second leg end and the associated seat cushion base member end 22 in the seating position to provide rigidity to the seat support frame assembly. The second latch 52 also has an unlatched condition disconnected between the associated second leg 42 and the adjacent side 18 of the seat cushion frame member 16 to permit pivoting of the pivotal connection 46 between the second leg end and the associated seat cushion base member end 22 during movement of the seat support frame assembly between the seating and stored positions. A release actuator 56 selectively releases the first and second latches from their latched conditions of FIG. 7 to their unlatched conditions of FIG. 8 to permit movement of the seat support frame assembly from the seating position to the stowed position.

With reference to FIG. 4, a pair of connectors 58 and 60 extend between the pair of first legs 28 from locations spaced from their ends 30 and 32. Furthermore, an auxiliary bracket 62 mounted on the bracket 38 connects one end 64 of a spring shock absorber 66 whose other end 68 is connected to the connector 58 so as to thereby control the movement of the frame assembly as it is moved between the seating and stowed positions.

As also illustrated in FIG. 4, the second legs 40 of the frame assembly are secured to each other by a plate connector 70 that cooperates with the connectors 58 and 60 associated with the first legs 28 to provide lateral stability to the frame assembly.

As also shown in FIG. 4, each side 18 of the seat cushion base member 16 of the frame assembly includes a control link 72 extending between the first and second legs 28 and 40 to control pivoting of the first and second legs with respect to the base member 16 during movement of the seat support frame assembly between the seating and stowed positions. More specifically, each control link 72 has a first end 74 including a pivotal connection 76 to the first leg 28 and a second end 78 including a pivotal connection 80 to the second leg 40. Furthermore, the pivotal connection 76 of the control link 72 to the first leg 28 is located closer to the pivotal connection 34 of the first leg to the one end 20 of the seat cushion base member 16 than the pivotal connection 80 of the control link to the second leg 40 is to the pivotal connection 46 of the second leg to the end 22 of the seat cushion base member.

With reference to FIG. 5, each latch assembly 48 which essentially embodies the associated second leg 40 includes a pair of latch plates 82 and 84 between which most of the components of the first and second latches 50 and 52 are mounted. These latch plates 82 and 84 are formed to facilitate pivoting of the components of the latch assembly as is hereinafter described.

As illustrated in FIG. 5, the first latch 50 includes a latch member 86 having a hole 87 that receives a pin 88 and a bushing 90 with the pin 88 also received within holes 91 in the latch plates 82 and 84 so the latch member 86 is pivotally mounted between the latch plates for pivotal movement between the latched position of FIG. 7 and the unlatched position of FIG. 8. In the FIG. 7 latched position as previously discussed, the first latch 50 secures the second leg 40 to the vehicle with the seat support frame assembly in the seating position. In the unlatched position of FIG. 8 as also was previously described, the first latch 50 permits the second leg 40 to be released to permit movement of the seat support frame assembly to the stowed position.

Figure 6:
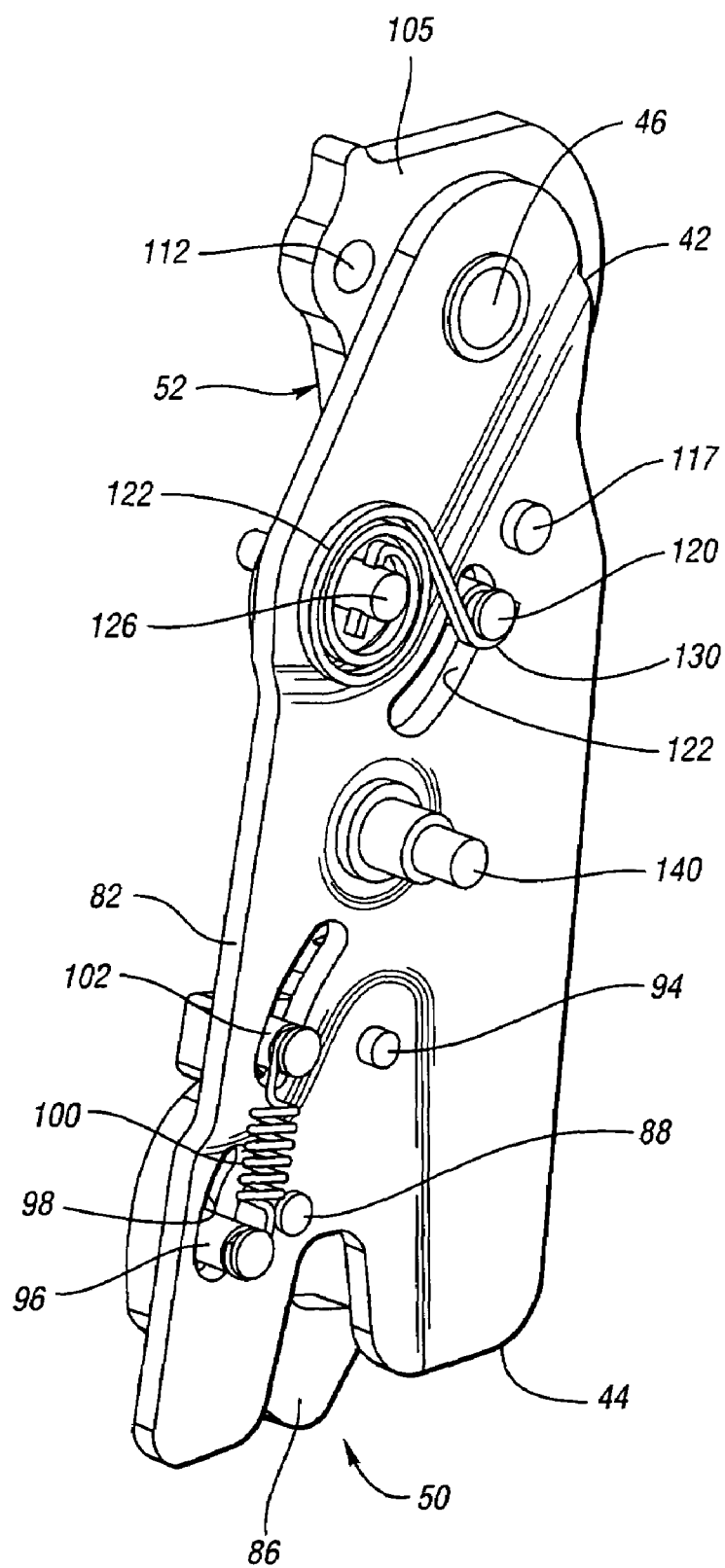
FIG. 6 is a perspective view showing the left plate of the latch assembly as illustrated in FIG. 5 and taken from the opposite side.

The first latch 50 as shown in FIG. 5 also includes a blocking member 92 having a hole 93 that receives a pin 94 also received by holes 95 in the latch plates 82 and 84 so the blocking member 92 is pivotally mounted between the latch plates for movement between the blocking position of FIG. 7 and an unblocked position of FIG. 8. In the blocking position of FIG. 7, the blocking member 92 engages the latch member 86 of the first latch to prevent its movement from the latched position. In the unblocked position of FIG. 8, the blocking member 92 disengages the latch member 86 of the first latch to permit its movement to the unlatched position so as to release the vehicle mounted striker 58 and permit the movement of the frame assembly to the stowed position. The first latch member 86 also includes a pin 96 received within a hole 97 in the latch member and extending through an arcuate slot 98 (FIG. 5) in the latch plate 82 and connected to one end of a spring 100 that is located on the outside of the plate 82 as can be seen in FIG. 6. The blocking member 92 of the first latch 50 also includes a hole 101 (FIG. 5) receiving a pin 102 that extends through another arcuate slot 104 in the latch plate 82 and is connected to the other end of the spring 100 as shown in FIG. 6. The operation of this spring 100 biases the latch member 86 counterclockwise as shown in FIGS. 7 and 8 and biases the blocking member 92 clockwise to its blocked position in engagement with the latch member 86. Upon movement of the frame assembly from the stowed position back to the seating position, the striker 54 shown in FIG. 8 engages the forked shape of the latch member 86 to move the latch member to its latched position and the blocking member 92 then is moved by the spring 100 shown in FIG. 6 into the blocking position of FIG. 7 to secure the first latch 50 in its latched condition. The release actuator 58 moves the blocking member 92 counterclockwise from the blocking position of FIG. 7 to the unblocked position of FIG. 8 to permit the release from the seating position for movement to the stowed position.

With further reference to FIGS. 5, 7 and 8, the second latch 52 includes a latching member 105 having a hole 105a that receives a pivotal connection pin 46 and a bushing 106 (FIG. 5) with the pin also received within holes 107 in the latch plates 82 and 84 to provide the connection between the end 42 of the associated second leg 40 and a bracket 108 at the end 22 of the adjacent side 18 of the seat cushion base member 16 as shown in FIG. 4. Another bolt connection 110 shown in FIG. 4 extends from the bracket 108 to a hole 112 (FIG. 5) in the latching member 105 to cooperate with the pivotal connection 46 in fixedly locating the latching member relative to the seat cushion base member end bracket 108 shown in FIG. 4. The second latch 52 also includes a blocking member 114 which, as shown in FIG. 5, has a hole 116 for receiving a pin 117 whose opposite ends are received within holes 118 in the latch plates 82 and 84 to pivotally mount the blocking member for movement between the blocking position of FIG. 7 and the unblocked position of FIG. 8 with respect to the latching member 105. The blocking member 114 also has a hole 119 that receives a pin 120 that extends through an arcuate slot 122 in the latch plate 82. On the outside of this latch plate 82, a spiral spring 124 is mounted on the end of a pin 126 that is received within holes 128 in the latch plates 82 and 84. As shown in FIG. 6, this spring 24 has an end 130 that is engaged with the end of the pin 120 extending outwardly from the latch plate 82 through the arcuate slot 122 as previously described. This spring 124 biases the pin 120 to bias the blocking member 114 in a clockwise direction as illustrated in FIGS. 7 and 8. The latching member 105 shown in FIGS. 7 and 8 has a latching lobe 132 that is received between the pin 126 and the blocking member 114 with the blocking member in its blocking position of FIG. 7. Upon operation of the release actuator 58, the blocking member 114 is pivoted counterclockwise from the blocking position of FIG. 7 to the unblocked position of FIG. 8 where the latching member 105 is free to pivot along with the adjacent end 22 of the side 18 of the seat cushion base member 16 in a counterclockwise direction relative to the second leg 40 embodied by the latch assembly 48. This release actuation thus permits movement of the frame assembly from the seating position to the stowed position as previously described.

The release actuator 56 includes a release member 134 shown in FIG. 5 as having a hole 136 that is mounted by a bushing 138 and an associated pin 140 the latter of which is received within holes 142 in the latch plates 82 and 84. The release member 134 includes first and second actuator arms 144 and 146 that have distal ends respectively received within openings in the blocking members 92 and 114 of the first and second latches 50 and 52, respectively. The spring 100 (FIG. 6) as previously described biases the first latch member 86 to its unlatched position and thereby biases the first blocking member 92 to its blocking position so as to bias the release member 134 through its arm 142 in a counterclockwise direction as shown in FIGS. 7 and 8 toward the unreleased position of FIG. 7. Furthermore, the spring 124 shown in FIG. 6 biases the blocking member 114 of the second latch 52 in a clockwise direction as shown in FIGS. 7 and 8 toward the blocking position of FIG. 7. This spring thus also biases the release member 134 of the release actuator 56 in a counterclockwise direction as shown in FIGS. 7 and 8 toward the unreleased position of FIG. 7. This release actuator 56 functions as a common actuator to move the blocking members 92 and 114 of the first and second latches 50 and 52 from their blocking positions to their unblocked positions to release each second leg 40 of the frame assembly for movement from the use position to the stowed position as previously described.

The release actuator 56 as shown in FIG. 5 has its release member 134 also provided with a release arm 148 having a hole 150 that receives a pin 152 which extends outwardly through an arcuate slot 154 in the one latch plate 84 shown in FIG. 5. As shown in FIG. 4, these pins 154 are connected to cable actuators 156 that are connected in any suitable manner to a release handle 158 whose manual actuation provides the release of both the first and second latches of each latch assembly as previously described. Upon release of the handle 158a, the first and second latches are moved by their spring biases as also previously described to permit relatching upon movement from the stowed position back to the seating position.

While the preferred embodiment has been described in detail, those familiar with the art to which the invention relates will recognize various alternative ways for practicing the invention as defined by the following claims.

What is claimed is:

1. A vehicle seat support frame assembly comprising:
a seat cushion base member having opposite ends;
a first leg having opposite ends one of which includes a pivot connection for providing pivotal connection to one of the ends of the seat cushion base member and the other of which includes a pivotal connection for providing pivotal connection thereof to an associated vehicle;
a second leg having opposite ends one of which includes a pivot connection for providing pivotal connection to the other end of the seat cushion base member and the other of which provides support thereof on the vehicle in a seating position; and a latch assembly including: (a) a first latch having a latched condition for providing connection of the other end of the second leg to the associated vehicle in the seating position and having an unlatched condition for releasing the other end of the second leg from the vehicle for pivoting of the pivotal connections and concomitant movement of the seat support frame assembly to a stowed position, (b) a second latch having a latched condition where the second latch extends between the second leg and the seat cushion base member in order to prevent pivoting of the pivotal connection between the one end of the second leg and other end of the seat cushion base member in the seating position to provide rigidity to the seat support frame assembly, and the second latch having an unlatched condition disconnected between the second leg and the seat cushion frame member to permit pivotal movement of the pivotal connection between the one end of the second leg and other end of the seat cushion base member during movement of the seat support frame assembly between the seating and stowed positions, and (c) a release actuator for selective releasing the first and second latches from their latched conditions to their unlatched conditions to permit movement of the seat support frame assembly from the seating position to the stowed position.

2. A vehicle seat support frame assembly as in claim 1 further including a control link extending between the first and second legs to control pivoting of the first and second legs with respect to the base member during movement of the seat support frame assembly between the seating and stowed positions.

3. A vehicle seat support frame assembly as in claim 2 wherein the control link has a first end including a pivotal connection to the first leg and a second end including a second connection to the second leg.

4. A vehicle seat support frame assembly as in claim 3 wherein the pivotal connection of the control link to the first leg is located closer to the pivotal connection of the first leg to the one end of the seat cushion base member than the pivotal connection of the control link to the second leg is to the pivotal connection of the second leg to the other end of the seat cushion base member.

5. A vehicle seat support frame assembly as in claim 1 wherein the first latch of the latch assembly includes a latch member having a latched position for securing the second leg to the vehicle with the seat support frame assembly in the seating position and having an unlatched position where the second leg is released to permit movement of the seat support frame assembly to the stowed position, and the first latch also including a blocking member that is movable between a blocking position where it holds the latch member of the first latch in its latched position and an unblocked position where the latch member of the first latch is movable to its unlatched position.

6. A vehicle seat support frame assembly as in claim 1 wherein the second latch of the latch assembly includes a latching member and a blocking member that is movable between a blocking position where it holds the latching member of the second latch to prevent pivoting of the second leg with respect to the seat cushion base member and an unblocked position where the latching member of the second latch permits pivoting of the second leg with respect to the seat cushion base member.

7. A vehicle seat support frame assembly as in claim 1 wherein the first latch includes a latch member having a latched position for securing the second leg to the vehicle with the seat support frame assembly in the seating position and having an unlatched position where the second leg is released to permit movement of the seat support frame assembly to the stowed position, the first latch also including a blocking member that is movable between a blocking position where it holds the latch member of the first latch in its latched position and an unblocked position where the latch member of the first latch is movable to its unlatched position, the second latch including a latching member and a blocking member that is movable between a blocking position where it holds the latching member of the second latch to prevent pivoting of the second leg with respect to the seat cushion base member and an unblocked position where the latching member of the second latch permits pivoting of the second leg with respect to the seat cushion base member, and the latch assembly including a common actuator that is actuated to move the blocking members of the first and second latches from their blocking positions to their unblocked positions to release the second leg of the seat support frame from the vehicle and permit pivoting of the second leg with respect to the seat cushion base member.

8. A vehicle seat support frame assembly as in claim 1 wherein the seat cushion base member includes a pair of laterally spaced sides each of which includes opposite ends; and the assembly further including a pair of the first legs respectively associated with the pair of sides of the seat cushion base member, a pair of the second legs respectively associated with the pair of sides of the seat cushion base member, and a pair of the latch assemblies respectively associated with the pair of sides of the seat cushion base member and that embody the pair of second legs.

9. A vehicle seat support frame assembly as in claim 8 further including a cable release connected to the release actuator of each of the pair of latch assemblies.

10. A vehicle seat support frame assembly comprising:
a seat cushion base member having a pair of laterally spaced sides each of which includes opposite ends;
a pair first legs each of which has opposite ends one of which includes a pivot connection for providing pivotal connection to one of the ends of one of the sides of the seat cushion base member and the other of which includes a pivotal connection for providing pivotal connection thereof to an associated vehicle;
a pair of second legs each of which has opposite ends one of which includes a pivot connection for providing pivotal connection to the other end of one of the sides of the seat cushion base member and the other of which provides support thereof on the vehicle in a seating position; and
a pair of latch assemblies respectively associated with the pair of second legs of the pair of sides of the seat cushion base member and each of which includes: (a) a first latch having a latched condition for providing connection of the other end of the associated second leg to the associated vehicle in the seating position and having an unlatched condition for releasing the other end of the associated second leg from the vehicle for pivoting of the pivotal connections and concomitant movement of the seat support frame assembly to a stowed position, (b) a second latch having a latched condition where the second latch extends between the associated second leg and the adjacent side of the seat cushion base member in order to prevent pivoting of the associated second leg with respect to the seat cushion base member and having an unlatched condition disconnected between the associated second leg and the adjacent side of the seat cushion frame member to permit pivoting of the associated second leg with respect to the seat cushion base member and movement of the seat support frame assembly between the seating and stowed positions, and (c) a release actuator for selective releasing the first and second latches from their latched conditions to their unlatched conditions to permit movement of the seat support frame assembly from the seating position to the stowed position.

11. A vehicle seat support frame assembly comprising:

a seat cushion base member having a pair of laterally spaced sides each of which includes opposite ends;

a pair first legs each of which has opposite ends one of which includes a pivot connection for providing pivotal connection to one of the ends of one of the sides of the seat cushion base member and the other of which includes a pivotal connection for providing pivotal connection thereof to an associated vehicle;

a pair of second legs each of which has opposite ends one of which includes a pivot connection for providing pivotal connection to the other end of one of the sides of the seat cushion base member and the other of which provides support thereof on the vehicle in a seating position;

a pair of latch assemblies respectively associated with the pair of second legs of the pair of sides of the seat cushion base member and each of which includes: (a) a first latch having a latched condition for providing connection of the other end of the associated second leg to the associated vehicle in the seating position and having an unlatched condition for releasing the other end of the associated second leg from the vehicle for pivoting of the pivotal connections and concomitant movement of the seat support frame assembly to a stowed position, (b) a second latch having a latched condition that prevents pivoting of the associated second leg with respect to the seat cushion base member and having an unlatched condition that permits pivoting of the associated second leg with respect to the seat cushion base member and movement of the seat support frame assembly between the seating and stowed positions, and (c) a release actuator for selective releasing the first and second latches from their latched conditions to their unlatched conditions to permit movement of the seat support frame assembly from the seating position to the stowed position; and a pair of control links respectively associated with the pair of sides of the seat cushion base member and extending between the first and second legs of thereof to control pivoting of the first and second legs with respect to the base member during movement of the seat support frame assembly between the seating and stowed positions, each control link having a first end including a pivotal connection to the associated first leg, and each control having a second end including a pivotal connection to the associated second leg.

12. A vehicle seat support frame assembly comprising:

a seat cushion base member having a pair of laterally spaced sides each of which includes opposite ends;

a pair first legs each of which has opposite ends one of which includes a pivot connection for providing pivotal connection to one of the ends of one of the sides of the seat cushion base member and the other of which includes a pivotal connection for providing pivotal connection thereof to an associated vehicle;

a pair of second legs each of which has opposite ends one of which includes a pivot connection for providing pivotal connection to the other end of one of the sides of the seat cushion base member and the other of which provides support thereof on the vehicle in a seating position; and a pair of latch assemblies respectively associated with the pair of second legs of the pair of sides of the seat cushion base member and each of which includes: (a) a first latch a latch member having a latched position for securing the associated second leg to the vehicle with the seat support frame assembly in the seating position and having an unlatched position where the associated second leg is released to permit movement of the seat support frame assembly to the stowed position, the first latch also including a blocking member that is movable between a blocking position where it holds its latch member in the latched position and an unblocked position where its latch member is movable to the unlatched position, (b) a second latch having a latching member mounted on the seat cushion base member and having a blocking member movable to a blocking position with respect to the latching member to maintain the latching member extending between the associated second leg and the adjacent side of the seat cushion base member in order to prevent pivoting of the pivotal connection between the one end of one of the associated second leg and other end of the associated side of the seat cushion base member in the seating position to provide rigidity to the seat support frame assembly, and the blocking member of the second latch having an unblocked position with respect to the latching member which is thereby disconnected between the associated second leg and the adjacent side of the seat cushion frame member to permit pivotal movement of the pivotal connection between the one end of the associated second leg and other end of the side of the seat cushion base member during movement of the seat support frame assembly between the seating and stowed positions, and (c) a release actuator for selective releasing the first and second latches from their latched conditions to their unlatched conditions to permit movement of the seat support frame assembly from the seating position to the stowed position.

* * * * *

UNITED STATES PATENT AND TRADEMARK OFFICE
CERTIFICATE OF CORRECTION

PATENT NO. : 6,991,293 B2  Page 1 of 1
DATED : January 31, 2006
INVENTOR(S) : Yue Lang et al.

It is certified that error appears in the above-identified patent and that said Letters Patent is hereby corrected as shown below:

Column 8,
Line 38, after "a pair" insert -- of --.

Column 9,
Line 12, after "a pair" insert -- of --.

Column 10,
Line 4, after "a pair" insert -- of --.

Signed and Sealed this

Fourth Day of April, 2006

JON W. DUDAS
*Director of the United States Patent and Trademark Office*